United States Patent
Hori

(10) Patent No.: US 9,415,676 B2
(45) Date of Patent: Aug. 16, 2016

(54) CONTROL APPARATUS FOR A HYBRID VEHICLE DRIVE SYSTEM

(71) Applicant: TOYOTA JIDOSHA KABUSHIKI KAISHA, Toyota-shi, Aichi (JP)

(72) Inventor: Tetsuo Hori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/721,676

(22) Filed: May 26, 2015

(65) Prior Publication Data

US 2015/0353072 A1 Dec. 10, 2015

(30) Foreign Application Priority Data

Jun. 6, 2014 (JP) .................................. 2014-118005

(51) Int. Cl.

| | |
|---|---|
| *B60W 10/02* | (2006.01) |
| *B60K 6/445* | (2007.10) |
| *B60W 20/00* | (2016.01) |
| *B60W 10/06* | (2006.01) |
| *B60W 10/08* | (2006.01) |

(52) U.S. Cl.
CPC ................ *B60K 6/445* (2013.01); *B60W 10/06* (2013.01); *B60W 10/08* (2013.01); *B60W 20/13* (2016.01); *B60W 20/40* (2013.01); *B60W 2510/244* (2013.01); *B60W 2710/0666* (2013.01); *B60W 2710/083* (2013.01); *Y10S 903/93* (2013.01); *Y10T 477/23* (2015.01)

(58) Field of Classification Search
None
See application file for complete search history.

(56) References Cited

U.S. PATENT DOCUMENTS

| | | | | |
|---|---|---|---|---|
| 6,966,866 | B2 * | 11/2005 | Ando | B60K 6/445 180/65.235 |
| 7,270,621 | B2 * | 9/2007 | Yamauchi | B60K 6/365 477/3 |
| 7,766,789 | B2 * | 8/2010 | Iwase | B60K 6/445 477/3 |
| 8,122,983 | B2 * | 2/2012 | Katsuta | B60K 6/387 180/65.225 |
| 8,965,611 | B2 * | 2/2015 | Choi | B60K 6/445 180/65.265 |
| 9,227,636 | B2 * | 1/2016 | Yamamoto | B60W 10/182 |
| 2013/0166120 | A1 | 6/2013 | Choi | |
| 2015/0011359 | A1 * | 1/2015 | Maruyama | B60K 6/445 477/4 |
| 2015/0057126 | A1 * | 2/2015 | Harada | B60K 6/445 477/4 |

FOREIGN PATENT DOCUMENTS

JP    2013-133101 A    7/2013

* cited by examiner

*Primary Examiner* — Dirk Wright
(74) *Attorney, Agent, or Firm* — Oliff PLC

(57) ABSTRACT

A control apparatus for a hybrid vehicle drive system including: a differential device provided with rotary elements respectively connected to an engine, first and second electric motors and an output rotary member; a brake for selectively fixing the rotary element connected to the first electric motor, to a stationary member; and a parking-lock mechanism preventing a rotary motion of a parking-lock gear connected to the output rotary member, when a manually-operated shifting device is operated to a parking-lock position. The control apparatus includes an engine starting control-portion configured to start the engine in a starting-mode wherein an operating speed of the engine is raised with a torque generated by the second electric motor in an engaged state of the brake, where the engine is required to be started while the vehicle has been held at rest and the rotary motion of the parking-lock gear is prevented by the parking-lock mechanism.

3 Claims, 9 Drawing Sheets

|  | CL1 | CL2 | BK1 | BK2 |
|---|---|---|---|---|
| HV1 |  |  |  | O |
| HV2 |  | O |  |  |
| EV1 |  |  |  | O |
| EV2 |  | O |  | O |
| 1ST-SPEED | O |  |  | O |
| 2ND-SPEED |  |  | O | O |
| 3RD-SPEED | O | O |  |  |
| 4TH-SPEED |  | O | O |  |

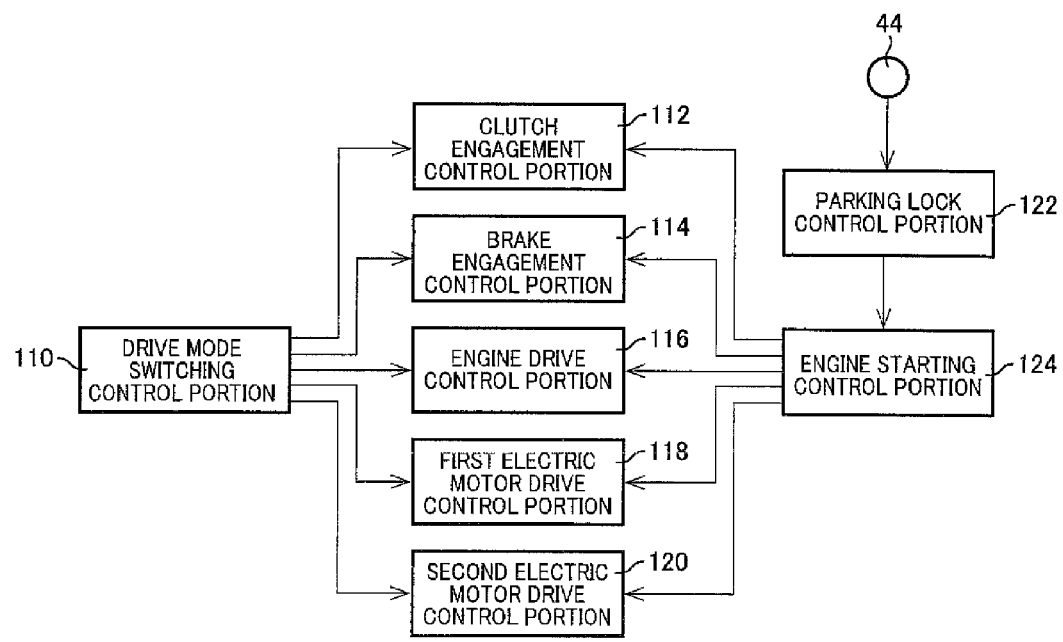

CONTROL APPARATUS FOR A HYBRID VEHICLE DRIVE SYSTEM

CROSS REFERENCE TO RELATED APPLICATION

The present application claims the priority from Japanese Patent Application No. 2014-118005 filed on Jun. 6, 2014, the disclosure of which is herein incorporated by reference in its entirety.

BACKGROUND OF THE INVENTION

1. Field of the Invention

The present invention relates to an improvement of a control apparatus for a drive system of a hybrid vehicle.

2. Description of Related Art

There is known a hybrid vehicle drive system including: a drive system of a hybrid vehicle including: a first differential mechanism provided with a rotary element connected to an engine and a rotary element connected to a first electric motor; a second differential mechanism provided with a rotary element connected to a second electric motor and a rotary element connected to an output rotary member; a brake configured to selectively fix another rotary elements of the second differential mechanism to a stationary member; and a clutch configured to selectively connect the rotary element of the first differential mechanism connected to the engine and the above-indicated another rotary element of the second differential mechanism. Regarding such a hybrid vehicle drive system, techniques for starting the engine have been proposed. JP-2013-133101 A1 discloses an example of such techniques, wherein EV controls of the drive system are implemented so as to improve fuel economy of the hybrid vehicle. According to this technique, the second electric motor is operated to generate a reaction force while the first electric motor is operated to generate a torque to raise an operating speed of the engine, in an engaged state of the brake and in a released state of the clutch, or in a released state of the brake and in an engaged state of the clutch.

According to the prior art techniques described above, however, there is a risk of failure to start the engine while an output of a battery is insufficient, as in a cold state of the engine, so that a sufficiently large amount of electric energy cannot be supplied to the first and second electric motors. This problem was first discovered by the inventor of the present invention in the process of an intensive study in an effort to improve the performance of the hybrid vehicle.

SUMMARY OF THE INVENTION

The present invention was made in view of the background art described above. It is therefore an object of the present invention to provide a control apparatus for a hybrid vehicle drive system, which permits adequate starting of an engine, irrespective of an output of a battery.

The object indicated above is achieved according to a first aspect of the present invention, which provides a control apparatus for a drive system of a hybrid vehicle including: a first differential mechanism provided with a rotary element connected to an engine and a rotary element connected to a first electric motor; a second differential mechanism provided with a rotary element connected to a second electric motor and a rotary element connected to an output rotary member; a brake configured to selectively fix the rotary element of the first differential mechanism connected to the first electric motor, to a stationary member; and a parking lock mechanism configured to prevent a rotary motion of a parking lock gear connected directly or indirectly to the output rotary member, when a manually operated shifting device is operated to a parking lock position, the control apparatus comprising an engine starting control portion configured to start the engine in a first starting mode in which an operating speed of the engine is raised with a torque generated by the second electric motor in an engaged state of the brake, where the engine is required to be started while the rotary motion of the parking lock gear is prevented by the parking lock mechanism and the vehicle has been held at rest.

As described above, the engine starting control portion of the control apparatus according to the first aspect of the invention described above is configured to start the engine in the first starting mode in which the operating speed of the engine is raised with the torque generated by the second electric motor in the engaged state of the brake, where the engine is required to be started while the rotary motion of the parking lock gear is prevented by the parking lock mechanism and the vehicle has been held at rest. Accordingly, the engine can be adequately started even while an output of a battery is insufficient, as in a cold state of the engine. Namely, the present invention provides a control apparatus for a hybrid vehicle drive system, which permits adequate starting of the engine, irrespective of the output of the battery.

According to a second aspect of the invention, the control apparatus according to the first aspect of the invention further comprises a battery sensor configured to detect an output of a battery, and the engine starting control portion starts the engine in the first starting mode when the output of the battery detected by the battery sensor is smaller than a predetermined threshold value. According to this second aspect of the invention, the engine can be adequately started even while the output of the battery is insufficient, as in the cold state of the engine.

According to a third aspect of the invention, the engine starting control portion of the control apparatus according to the second aspect of the invention starts the engine in a second starting mode in which the operating speed of the engine is raised with a torque generated by the first electric motor while the second electric motor is operated to generate a reaction torque, where the engine is required to be started while the output of the battery detected by the battery sensor is not smaller than the predetermined threshold value. According to this third aspect of the invention, the first and second electric motors cooperate with each other to crank the engine for starting the engine where the output of the battery is sufficient. Therefore, the hybrid vehicle can smoothly start running after the engine has been started.

The hybrid vehicle drive system according to any one of the first through third aspects of the invention is preferably configured such that the first differential mechanism is provided with a first rotary element, a second rotary element and a third rotary element, and the second differential mechanism is provided with a first rotary element, a second rotary element and a third rotary element, and such that the first electric motor and the engine are respectively connected to the first and second rotary elements of the first differential mechanism, and the third rotary element of the first differential mechanism and the third rotary element of the second differential mechanism are connected to each other, and further such that the output rotary member is connected to the second rotary element of the second differential mechanism, and the second electric motor is connected to the third rotary element of the second differential mechanism. In this case, the engine starting control portion permits adequate starting of the engine irrespective of the output of the battery in the hybrid vehicle drive system which has a practical arrangement as described above.

Preferably, the above-described brake is provided to selectively fix the first rotary element of the first differential mechanism to the stationary member. In this case, the engine starting control portion permits adequate starting of the engine irrespective of the output of the battery in the hybrid vehicle drive system which has a practical arrangement as described above.

Preferably, the hybrid vehicle drive system further comprises a first clutch configured to selectively connect the first and second rotary elements of the first differential mechanism to each other, a second clutch configured to selectively connect the second rotary element of the first differential mechanism and the first rotary element of the second differential mechanism to each other, and a second brake configured to selectively fix the first rotary element of the second differential mechanism to the stationary member. In this case, the engine starting control portion permits adequate starting of the engine irrespective of the output of the battery in the hybrid vehicle drive system which has a practical arrangement as described above.

The above-indicated threshold value is a predetermined lower limit of the output of the battery above which the operating speed of the engine can be sufficiently raised for starting the engine with the torque generated by the first electric motor while the second electric motor is operated to generate a reaction force. In this case, the first and second electric motors cooperate with each other to crank the engine for starting the engine where the output of the battery is sufficient. Therefore, the hybrid vehicle can smoothly start running after the engine has been started.

BRIEF DESCRIPTION OF THE DRAWINGS

FIG. 12 is a functional block diagram illustrating major control functions of an electronic control device shown in FIG. 2;

FIG. 13 is a table indicating the operating states of the clutches and brakes when an engine of the drive system of FIG. 1 is started in a first starting mode;

DETAILED DESCRIPTION OF PREFERRED EMBODIMENT

Figure 1:
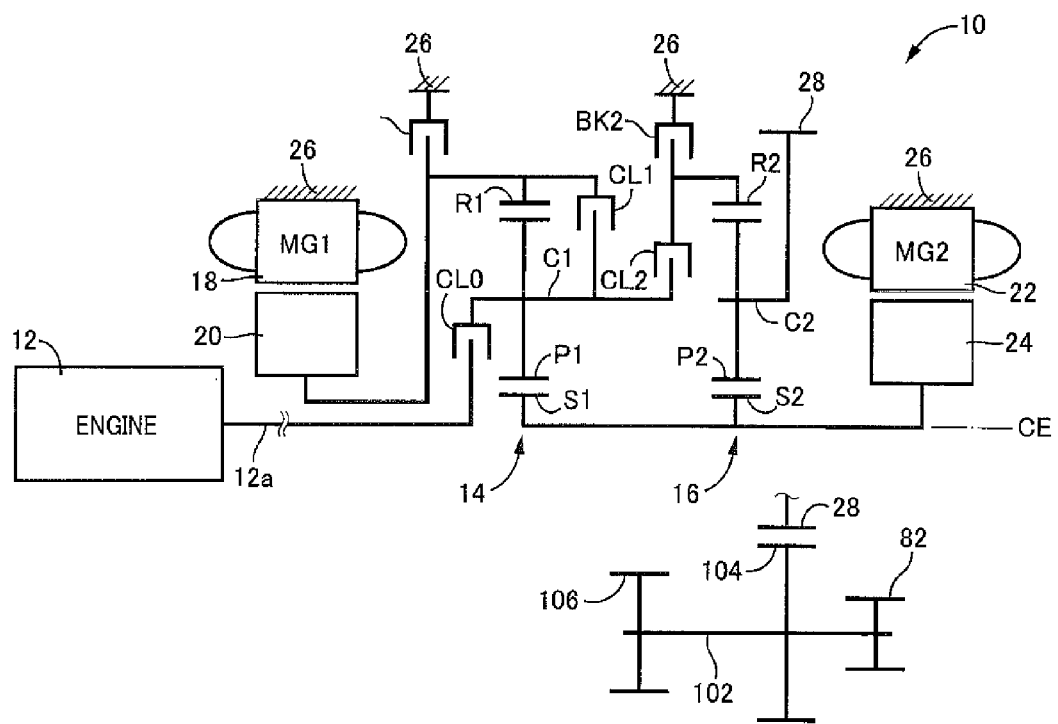
FIG. 1 is a schematic view showing an arrangement of a hybrid vehicle drive system to which the present invention is suitably applicable.

Referring to the drawings, a preferred embodiment of the present invention will be described in detail. It is to be understood that the drawings referred to below do not necessarily accurately represent ratios of dimensions of various elements.

Embodiment

FIG. 1 is the schematic view showing an arrangement of a hybrid vehicle drive system 10 (hereinafter referred to simply as a "drive system 10") to which the present invention is suitably applicable. As shown in FIG. 1, the drive system 10 according to the present embodiment is of a transversely installed type suitably used for an FF (front-engine front-drive) type vehicle, and is provided with a main vehicle drive power source in the form of an engine 12, a first electric motor MG1, a second electric motor MG2, a first differential mechanism in the form of a first planetary gear set 14, and a second differential mechanism in the form of a second planetary gear set 16, which are disposed on a common axis CE. In the following description of the embodiment, the direction of extension of this axis CE will be referred to as an "axial direction". The drive system 10 is constructed substantially symmetrically with respect to the axis CE. In FIG. 1, a lower half of the drive system 10 is not shown.

The engine 12 is an internal combustion engine such as a gasoline engine, which is operated to generate a drive force by combustion of a fuel such as a gasoline injected into its cylinders. Each of the first and second electric motors MG1 and MG2 is a so-called motor/generator having a function of a motor operated to generate a drive force, and a function of an electric generator operated to generate a reaction force, and is provided with a stator 18, 22 connected to a stationary member in the form of a housing (casing) 26, and a rotor 20, 24 disposed radially inwardly of the stator 18, 22.

The first planetary gear set 14 is a single-pinion type planetary gear set which has a gear ratio ρ1 and which includes rotary elements consisting of: a first rotary element in the form of a ring gear R1; a second rotary element in the form of a carrier C1 supporting a pinion gear P1 such that the pinion gear P1 is rotatable about its axis and the axis of the planetary gear set; and a third rotary element in the form of a sun gear S1 meshing with the ring gear R1 through the pinion gear P1. The second planetary gear set 16 is a single-pinion type planetary gear set which has a gear ratio ρ2 and which includes rotary elements consisting of: a first rotary element in the form of a ring gear R2; a second rotary element in the form of a carrier C2 supporting a pinion gear P2 such that the pinion gear P2 is rotatable about its axis and the axis of the planetary gear set; and a third rotary element in the form of a sun gear S2 meshing with the ring gear R2 through the pinion gear P2.

In the first planetary gear set 14, the ring gear R1 is connected to the rotor 20 of the first electric motor MG1, and the carrier C1 is selectively connectable through a clutch CL0 to an output shaft of the engine 12 in the form of a crankshaft 12a, while the sun gear S1 is fixed to the sun gear S2 of the second planetary gear set 16 and the rotor 24 of the second electric motor MG2. In the second planetary gear set 16, the carrier C2 is fixed to an output rotary member in the form of an output gear 28. A drive force received by the output gear 28 is transmitted to a pair of right and left drive wheels (not shown) through a differential gear device and axles (not shown). A torque received by the drive wheels from a roadway surface during running of the hybrid vehicle is transmitted from the output gear 28 to the drive system 10 through the differential gear device and axles.

The clutch CL0 for selectively connecting and disconnecting the carrier C1 of the first planetary gear set 14 to and from the crankshaft 12a of the engine 12 is disposed between the crankshaft 12a and the carrier C1. A clutch CL1 for selectively connecting and disconnecting the carrier C1 to and from the ring gear R1 is disposed between the carrier C1 and the ring gear R1. A clutch CL2 for selectively connecting and disconnecting the carrier C1 to and from the ring gear R2 of the second planetary gear set 16 is disposed between the carrier C1 and the ring gear R2. A brake BK1 for selectively fixing the ring gear R1 to the stationary member in the form of the housing 26 is disposed between the ring gear R1 and the housing 26. A brake BK2 for selectively fixing the ring gear R2 to the housing 26 is disposed between the ring gear R2 and the housing 26.

Each of the clutches CL0, CL1 and CL2 (hereinafter collectively referred to as "clutches CL" unless otherwise specified), and the brakes BK1 and BK2 (hereinafter collectively referred to as "brakes BK" unless otherwise specified) is preferably a hydraulically operated coupling device the operating state of which is controlled (which is engaged and released) according to a hydraulic pressure applied thereto from a hydraulic control unit 54. While wet multiple-disc type frictional coupling devices are preferably used as the clutches CL and brakes BK, meshing type coupling devices, namely, so-called dog clutches (claw clutches) may also be used. Alternatively, the clutches CL and brakes BK may be electromagnetic clutches, magnetic powder clutches and any other clutches the operating states of which are controlled (which are engaged and released) according to electric commands generated from an electronic control device 30.

In the drive system 10 constructed as described above, the carrier C1 and the ring gear R1 of the first planetary gear set 14 are connected to each other through the clutch CL1 placed in its engaged state, so that the rotary elements of the first planetary gear set 14 are rotated as a single unit when a rotary motion of the engine 12 is received by the first planetary gear set 14, whereby a ratio of the operating speed of the first planetary gear 14 to the operating speed of the engine 12 is held constant. Further, the ring gear R1 of the first planetary gear set 14 is fixed to the housing 26 through the brake BK1 placed in its engaged state, so that the ratio of the operating speed of the first planetary gear set 14 to the operating speed of the engine 12 is held constant. In other words, a differential function of the first planetary gear set 14 with respect to the rotary motion of the engine 12 is limited in the engaged state of the clutch CL1 or the brake BK1, so that a ratio of the output speed to the input speed of the first planetary gear set 14 is held constant at a predetermined value.

In the drive system 10, a differential device comprising the first and second planetary gear sets 14 and 16 is provided with four rotary components when the clutch CL2 is placed in the engaged state. In other words, the drive system 10 includes: the differential device comprising the first planetary gear set 14 and the second planetary gear set 16 and provided with the four rotary components the relative rotating speeds of which are represented along a vertical axis in each of two-dimensional collinear charts of FIGS. 5-11 referred to below, in which the relative gear ratios of the first and second planetary gear sets 14 and 16 are taken along a horizontal axis; and the engine 12, the first electric motor MG1, the second electric motor MG2 and the output gear 28, which are respectively connected to the above-indicated four rotary components. One of the four rotary components is constituted by the carrier C1 of the first planetary gear set 14 and the ring gear R2 of the second planetary gear set 16 which are selectively connected to each other through the clutch CL2, and the ring gear R2 selectively connected to the carrier C1 through the clutch CL2 is selectively fixed to the housing 26 through the brake BK2.

In the present drive system 10, the clutch CL0 need not be provided. That is, the crankshaft 12a of the engine 12 may be directly connected to the carrier C1 of the first planetary gear set 14, or indirectly through a damper, for example, without the clutch CL0 being disposed therebetween. The clutch CL0 is selectively placed in the engaged or released state depending upon the running state of the hybrid vehicle provided with the drive system 10. However, the present embodiment will be described on the assumption that the clutch CL0 is held in the engaged state.

Figure 2:
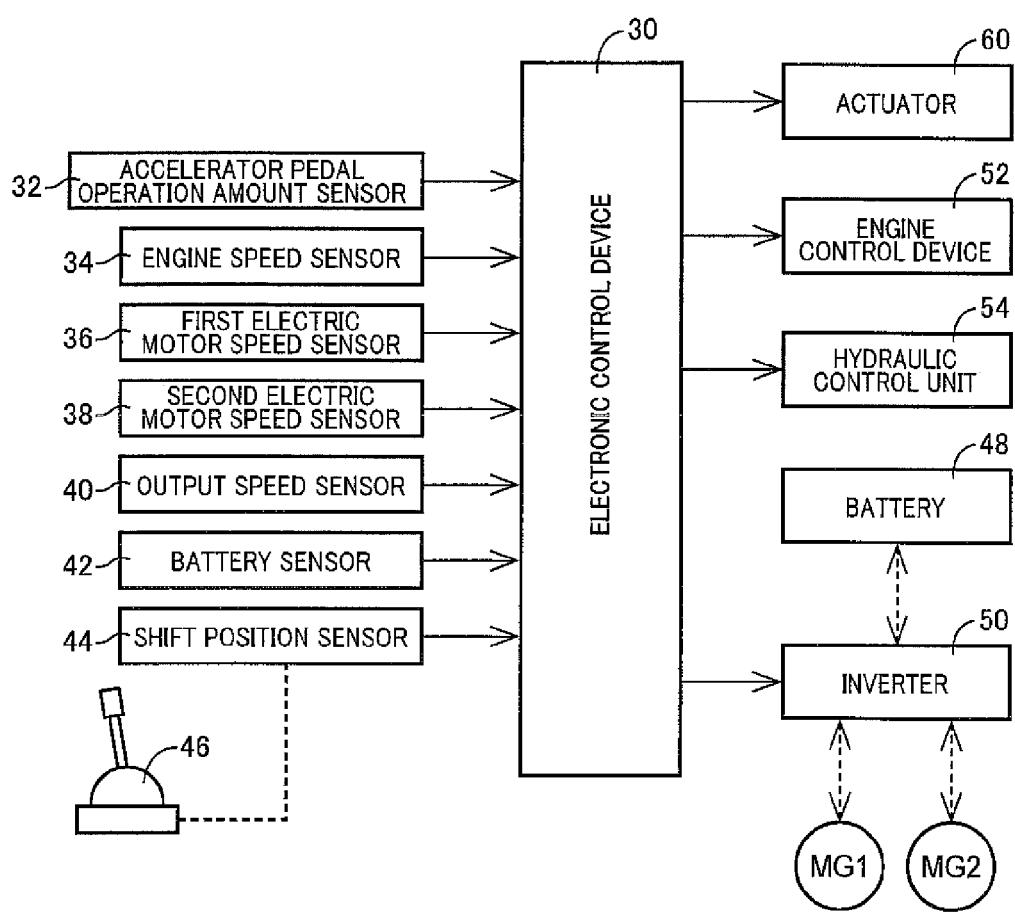
FIG. 2 is a block diagram illustrating major portions of a control system provided to control the drive system of FIG. 1.

FIG. 2 is the block diagram illustrating major portions of a control system provided to control the drive system 10. The electronic control device 30 shown in FIG. 2 is a so-called microcomputer which incorporates a CPU, a ROM, a RAM and an input-output interface and which is operable to perform signal processing operations according to programs stored in the ROM while utilizing a temporary data storage function of the RAM, to implement various drive controls of the drive system 10, such as a drive control of the engine 12 and hybrid drive controls of the first and second electric motors MG1 and MG2. In the present embodiment, the electronic control device 30 serves as a control apparatus for the drive system 10. The electronic control device 30 may be constituted by mutually independent control units as needed for respective controls such as an output control of the engine 12 and drive controls of the first and second electric motors MG1 and MG2. For example, a control unit for a shift switching device 58 (which will be described) may be independent of the control units for the output control of the engine 12 and the drive controls of the first and second electric motors MG1 and MG2.

As indicated in FIG. 2, the electronic control device 30 is configured to receive various signals from sensors and switches provided in the drive system 10. Namely, the electronic control device 30 receives: an output signal of an accelerator pedal operation amount sensor 32 indicative of an operation amount or angle $A_{CC}$ of an accelerator pedal (not shown), which corresponds to a vehicle output required by a vehicle operator; an output signal of an engine speed sensor 34 indicative of an engine speed $N_E$, that is, an operating speed of the engine 12; an output signal of a first electric motor speed sensor 36 indicative of an operating speed $N_{MG1}$ of the first electric motor MG1; an output signal of a second electric motor speed sensor 38 indicative of an operating speed $N_{MG2}$ of the second electric motor MG2; an output signal of a running speed detector in the form of an output speed sensor 40 indicative of a rotating speed $N_{OUT}$ of the output gear 28, which corresponds to a running speed V of the hybrid vehicle; an output signal of a battery sensor 42 indicative of an output $P_{bt}$ of a battery 48; and an output signal of a shift position sensor 44 indicative of a presently selected shift position $P_S$ of a manually operated shifting device 46. For instance, the battery sensor 42 detects an electromotive force of the battery 48, as a value equivalent to the output $P_{bt}$.

The electronic control device 30 is also configured to generate various control commands to be applied to various portions of the drive system 10. Namely, the electronic control device 30 applies, to an engine control device 52, engine output control commands for controlling the output of the engine 12, which commands include: a fuel injection amount control signal to control an amount of injection of a fuel by a fuel injecting device into an intake pipe; an ignition control signal to control a timing of ignition of the engine 12 by an igniting device; and an electronic throttle valve drive control signal to control a throttle actuator for controlling an opening angle $\theta_{TH}$ of an electronic throttle valve. Further, the electronic control device 30 applies command signals to an inverter 50, for controlling operations of the first and second electric motors MG1 and MG2, so that the first and second electric motors MG1 and MG2 are operated with electric energies supplied thereto from the battery 48 through the inverter 50 according to the command signals to control outputs (output torques) of the electric motors MG1 and MG2. Electric energies generated by the first and second electric motors MG1 and MG2 are supplied to and stored in the battery 48 through the inverter 50. Further, the electronic control device 30 applies command signals for controlling the operating states of the clutches CL0, CL1 and CL2 and brakes BK1 and BK2, to electromagnetic control valves such as linear solenoid valves provided in the hydraulic control unit 54, so that hydraulic pressures generated by those electromagnetic control valves are controlled to control the operating states of the clutches CL and brakes BK.

Figure 3:
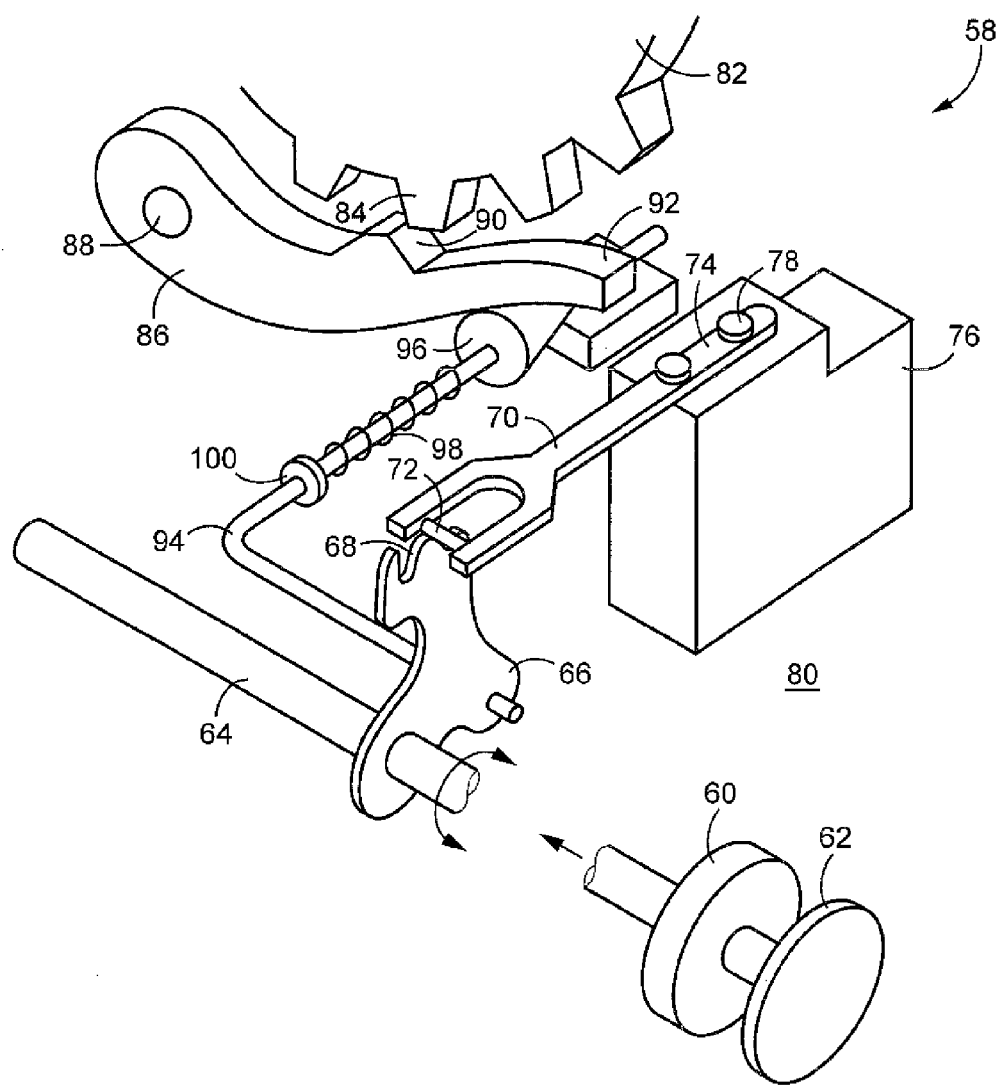
FIG. 3 is a perspective view showing an arrangement of a shift switching device provided in the drive system of FIG. 1.

FIG. 3 is the perspective view showing an arrangement of the above-indicated shift switching device 58 provided in the drive system 10. As shown in FIG. 3, the shift switching device 58 includes: a shaft member 64 rotated by an actuator 60; a detent member 66 which is fixed to a predetermined axial portion of the shaft member 64 in a non-rotatable manner such that the detent member 66 is pivoted about an axis of the shaft member 64 together with the shaft member 64, and which has a cam surface 68 formed along its periphery and provided with a first recess and a second recess respectively defining a parking-lock position and a non-parking-lock position; and an engaging member 70 in the form of an elongate spring sheet which is provided at its respective opposite end portions with an engaging portion 72 held in pressing contact with the cam surface 68 of the detent member 66 by a biasing force, for selective engagement with the first and second recesses, and a fixing portion 74 at which the engaging member 70 is fixed to a fixing member 76 by fasteners 78 such as screws. A body of the actuator 60, and the fixing member 76 are fixed to a housing 80. The detent member 66 may also be called a "detent plate", "parking lever" or "detent lever", for example, while the engaging member 70 may also be called a "detent spring", for example.

As shown in FIG. 1, the drive system 10 is provided with: a counter shaft 102 disposed in a power transmitting path between the output gear 28 and the drive wheels (not shown); and a counter driven gear 104, a final drive gear 106 and a parking lock gear 82 which are fixed integrally to the counter shaft 102 such that the counter driven gear 104, final drive gear 106 and parking lock gear 82 are coaxial with the counter shaft 102. Preferably, the parking lock gear 82 is fixed to one of opposite axial ends of the counter shaft 102. The counter driven gear 104 is held in meshing engagement with the output gear 28, so that a drive force is transmitted from the output gear 28 to the drive wheels through the counter driven gear 104, counter shaft 102, final drive gear 106, etc.

Referring back to FIG. 3, the shift switching device 58 further includes a parking lock pawl (engaging pawl member) 86 in the form of an elongate lever which is pivotable between a parking-lock position in which the parking lock pawl 86 engages external teeth 84 of the parking lock gear 82, and a non-parking-lock position. This parking lock pawl 86 is supported by the housing 80 such that the parking lock pawl 86 is pivotable about a pin 88 located at its proximal end. The parking lock pawl 86 has an engaging tooth 90 formed in its longitudinally intermediate portion, for engagement with the external teeth 84, and a sliding portion 92 formed in its distal or free end portion, for engagement with a parking lock cam 96. The parking lock pawl 86 is normally held by a return spring (not shown) in the non-parking-lock position in which the engaging tooth 90 is not in engagement with the external teeth 84.

The parking lock cam 96 is fixed to a distal or free end portion of an L-shaped parking rod 94 which is pivotably connected at its proximal end portion to the detent member 66, so that the parking lock cam 96 is axially movable by the parking rod 94. The parking lock cam 96 has a tapered cam surface, and is biased toward a stopper (not shown), with a preset preloading force generated by a pre-loading spring 98 in the form of a coil disposed between the parking lock cam 96 and a spring seat 100 fixed to a predetermined longitudinal part of the distal end portion of the parking rod 94. The parking rod 94 is supported such that the distal end portion is movable in its longitudinal direction (in a direction perpendicular to the axis about which the parking rod 94 is pivotably connected to the detent member 66), so that the parking lock cam 96 is movable in sliding contact with the sliding portion 92 of the parking lock pawl 86.

The engaging member 70 is preferably an elongate sheet spring, so that the engaging portion 72 provided at the distal end of the engaging member 70 is normally held in pressing contact with the cam surface 68 of the detent member 66 with a predetermined biasing force of the sheet spring. The engaging portion 72 takes the form of a roller supported at the distal end of the engaging member 70 rotatably about an axis parallel to the axis of pivoting of the detent member 66. In this arrangement, the detent member 66 is held in the parking-lock position with the engaging portion 72 held in engagement with the first recess, and in the non-parking-lock position with the engaging portion 72 held in engagement with the second recess.

In the non-parking-lock position of the detent member 66, the engaging tooth 90 of the parking lock pawl 86 is not in engagement with the external teeth 84 of the parking lock gear 82. In this non-parking-lock position, a rotary motion of the parking lock gear 82 is not prevented by the parking lock pawl 86. In the parking-lock position of the detent member 66, the engaging tooth 90 of the parking lock pawl 86 is held in engagement with the external teeth 84 of the parking lock gear 82. In this parking-lock position, the shift switching device 58 is placed in a parking lock state in which the rotary motion of the parking lock gear 82 is prevented by the parking lock pawl 86. Namely, rotary motions of the drive wheels (not shown) indirectly connected to the parking lock gear 82 are prevented.

The electronic control device 30 controls an operation of the actuator 60, on the basis of an output signal of an encoder 62 provided to detect a rotary position of the actuator 60, to perform a shift switching control of the shift switching device 58 for selectively placing the drive system 10 in a parking position and non-parking positions. The actuator 60 is constituted by an electric motor such as a switched reluctance motor (SRM), for instance, and functions to actuate the shift switching device 58 according to command signals received from the electronic control device 30. The encoder 62 is rotated together with a rotary member of the actuator 60, and supplies the electronic control device 30 with the output signal indicative of the rotary position of the actuator 60. Preferably, the encoder 62 is a rotary encoder configured to generate A-phase, B-phase and Z-phase signals.

The electronic control device 30 controls the operation of the actuator 60 in a feedback fashion on the basis of the output signal of the encoder 62 indicative of the rotary position of the actuator 60. When the selection of the parking position of the manually operated shifting device 46 is detected by the shift position sensor 44, for instance, the electronic control device 30 controls the actuator 60 so as to place the detent member 66 in its parking lock position. Namely, the shift switching device 58 functions as a parking lock mechanism configured to prevent the rotary motion of the parking lock gear 82 connected indirectly to the output gear 28, when the shifting device 46 is operated to the parking position.

An operating state of the drive system 10 is controlled through the first and second electric motors MG1 and MG2, such that the drive system 10 functions as an electrically controlled differential portion whose difference of input and output speeds is controllable. For example, an electric energy generated by the first electric motor MG1 is supplied to the battery 48 or the second electric motor MG2 through the inverter 50. Namely, a major portion of the drive force of the engine 12 is mechanically transmitted to the output gear 28, while the remaining portion of the drive force is consumed by the first electric motor MG1 operating as the electric generator, and converted into the electric energy, which is supplied to the second electric motor MG2 through the inverter 50, so that the second electric motor MG2 is operated to generate a drive force to be transmitted to the output gear 28. Components associated with the generation of the electric energy and the consumption of the generated electric energy by the second electric motor MG2 constitute an electric path through which a portion of the drive force of the engine 12 is converted into an electric energy which is converted into a mechanical energy.

Figures 4, 5:
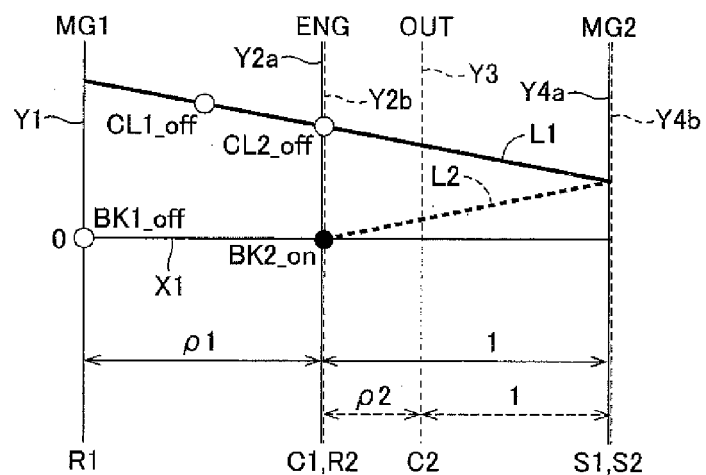
FIG. 4 is a table indicating combinations of operating states of clutches and brakes, which correspond to respective vehicle drive modes to be established in the drive system of FIG. 1.
FIG. 5 is a collinear chart having straight lines which permit indication thereon of relative rotating speeds of various rotary elements of the drive system of FIG. 1, the collinear chart corresponding to drive modes HV1 and EV1 indicated in FIG. 4.

In the hybrid vehicle provided with the drive system 10 constructed as described above, a selected one of a plurality of vehicle drive modes is established according to the operating states of the engine 12 and the first and second electric motors MG1 and MG2, and the operating states of the clutches CL and brakes BK. FIG. 4 is the table indicating combinations of the operating states of the clutches CL1 and CL2 and the brakes BK1 and BK2, which correspond to the respective eight vehicle drive modes of the drive system 10. In this table, "o" marks represent the engaged states of the clutches CL and brakes BK while blanks represent their released states. Drive modes HV1 and HV2 are hybrid drive modes in which the engine 12 is operated as the vehicle drive power source while the first and second electric motors MG1 and MG2 are operated as needed to generate a vehicle drive force and/or an electric energy. In these hybrid drive modes HV1 and HV2, at least one of the first and second electric motors MG1 and MG2 can be operated to generate a reaction force or placed in a non-loaded free state. Drive modes EV1 and EV2 indicated in FIG. 4 are EV drive modes in which the engine 12 is held at rest while at least one of the first and second electric motors MG1 and MG2 is used as the vehicle drive power source. Drive modes "$1^{st}$-speed" through "$4^{th}$-speed" are constant-speed-ratio drive modes which are established when the differential function of the first and second planetary gear sets 14 and 16 is limited, and in which the ratios of the output speeds of the first and second planetary gear sets 14 and 16 to the speed of the rotary motion received from the engine 12 are held constant.

In the drive system 10, the clutch CL1 and the brake BK1 are both placed in the released states, as indicated in FIG. 4, to permit the first planetary gear set 14 to perform the differential function with respect to the rotary motion received from the engine 12, in the hybrid drive modes HV1 and HV2 in which the engine 12 is operated as the vehicle drive power source while the first and second electric motors MG1 and MG2 are operated as needed to generate a drive force and/or an electric energy. The hybrid drive mode HV1 is established when the brake BK2 is placed in the engaged state while the clutch CL2 is placed in the released state, and the hybrid drive mode HV2 is established when the brake BK2 is placed in the released state while the clutch CL2 is placed in the engaged state.

The clutch CL1 and the brake BK1 are both placed in the released states, to permit the first planetary gear set 14 to perform the differential function with respect to the rotary motion received from the engine 12, also in the EV drive modes in which at least one of the first and second electric motors MG1 and MG2 is operated as the vehicle drive power source while the engine 12 is held at rest. The EV drive mode EV1 is established when the brake BK2 is placed in the engaged state while the clutch CL2 is placed in the released state, and the EV drive mode EV2 is established when the brake BK2 and the clutch CL2 are both placed in the engaged states.

In the constant-speed-ratio drive modes in which ratios of the output speeds of the first and second planetary gear sets 14 and 16 to the speed of the rotary motion received from the engine 12 are held constant, either one of the clutch CL1 and the brake BK1 is placed in the engaged state to limit the differential function of the first planetary gear set 14 with respect to the rotary motion received from the engine 12. The constant-speed-ratio drive mode "$1^{st}$-speed" which is a first-speed drive mode having the highest speed ratio value is established when the clutch CL1 and the brake BK2 are placed in the engaged states while the clutch CL2 and the brake BK1 are placed in the released states. The constant-speed-ratio drive mode "$2^{nd}$-speed" which is a second-speed drive mode having a speed ratio value lower than that of the constant-speed-ratio drive mode "$1^{st}$-speed" is established when the clutches CL1 and CL2 are placed in the released states while the brakes BK1 and BK2 are placed in the engaged states. The constant-speed-ratio drive mode "$3^{rd}$-speed" which is a third-speed drive mode having a speed ratio value lower than that of the constant-speed-ratio drive mode "$2^{nd}$-speed" is established when the clutches CL1 and CL2 are placed in the engaged states while the brakes BK1 and BK2 are placed in the released states. The constant-speedratio drive mode "4$^{th}$-speed" which is a fourth-speed drive mode having the lowest speed ratio value is established when the clutch CL1 and the brake BK2 are placed in the released states while the clutch CL2 and the brake BK1 are placed in the engaged states.

FIGS. 5-11 are the collinear charts each having straight lines which permit indication thereon of the relative rotating speeds of the various rotary components of the drive system 10 (rotary elements of the first and second planetary gear sets 14 and 16), in respective different states of connection of the rotary elements corresponding to the respective different combinations of the operating states of the clutches CL1 and CL2 and the brakes BK1 and BK2. Each of these collinear charts is defined in a two-dimensional coordinate system having a horizontal axis along which the relative gear ratios ρ of the first and second planetary gear sets 14 and 16 are taken, and a vertical axis along which the relative rotating speeds of the rotary elements are taken. The collinear charts indicate the relative rotating speeds when the output gear 28 is rotated in the positive direction to drive the hybrid vehicle in the forward direction. A horizontal line X1 represents the rotating speed of zero, while vertical lines Y1, Y2$a$, Y2$b$, Y3, Y4$a$ and Y4$b$ arranged in the order of description in the rightward direction represent the respective relative rotating speeds of the various rotary elements. Namely, a solid line Y1 represents the rotating speed of the ring gear R1 of the first planetary gear set 14 (first electric motor MG1), and a solid line Y2$a$ represents the rotating speed of the carrier C1 of the first planetary gear set 14 (engine 12), while a broken line Y2$b$ represents the rotating speed of the ring gear R2 of the second planetary gear set 16. A broken line Y3 represents the rotating speed of the carrier C2 of the second planetary gear set 16 (output gear 28), and a solid line Y4$a$ represents the rotating speed of the sun gear S1 of the first planetary gear set 14, while a broken line Y4$b$ represents the rotating speed of the sun gear S2 of the second planetary gear set 16 (second electric motor MG2). In FIGS. 5-11, the vertical lines Y2$a$ and Y2$b$ are superimposed on each other, while the vertical lines Y4$a$ and Y4$b$ are superimposed on each other. Since the sun gears S1 and S2 are fixed to each other, the relative rotating speeds of the sun gears S1 and S2 represented by the vertical lines Y4$a$ and Y4$b$ are equal to each other.

In FIGS. 5-11, a solid line L1 represents the relative rotating speeds of the three rotary elements of the first planetary gear set 14, while a broken line L2 represents the relative rotating speeds of the three rotary elements of the second planetary gear set 16. Distances between the vertical lines Y1-Y4 (Y2$b$-Y4$b$) are determined by the gear ratios ρ1 and ρ2 of the first and second planetary gear sets 14 and 16. Described more specifically, regarding the vertical lines Y1, Y2$a$ and Y4$a$ corresponding to the respective three rotary elements of the first planetary gear set 14, a distance between the vertical lines Y2$a$ and Y4$a$ respectively corresponding to the carrier C1 and the sun gear S1 corresponds to "1", while a distance between the vertical lines Y1 and Y2$a$ respectively corresponding to the ring gear R1 and the carrier C1 corresponds to the gear ratio "ρ1". Regarding the vertical lines Y2$b$, Y3 and Y4$b$ corresponding to the respective three rotary elements of the second planetary gear set 16, a distance between the vertical lines Y3 and Y4$b$ respectively corresponding to the carrier C2 and the sun gear S2 corresponds to "1", while a distance between the vertical lines Y2$b$ and Y3 respectively corresponding to the ring gear R2 and the carrier C2 corresponds to the gear ratio "ρ2". The drive modes of the drive system 10 will be described by reference to FIGS. 5-11.

The collinear chart of FIG. 5 corresponds to the drive mode HV1 of the drive system 10, which is preferably the hybrid drive mode in which the engine 12 is used as the vehicle drive power source while the first and second electric motors MG1 and MG2 are operated as needed to generate a drive force and/or an electric energy. Described by reference to this collinear chart of FIG. 5, the differential function of the first planetary gear set 14 with respect to the rotary motion received from the engine 12 is permitted in the released states of the clutch CL1 and the brake BK1, and the carrier C1 of the first planetary gear set 14 and the ring gear R2 of the second planetary gear set 16 are rotatable relative to each other in the released state of the clutch CL2. In the engaged state of the brake BK2, the ring gear R2 of the second planetary gear set 16 is fixed to the stationary member in the form of the housing 26, so that the rotating speed of the ring gear R2 is held zero. In this drive mode HV1, the engine 12 is operated to generate an output torque by which the output gear 28 is rotated. At this time, the first electric motor MG1 is operated to generate a reaction torque in the first planetary gear set 14, so that the output of the engine 12 can be transmitted to the output gear 28. In the second planetary gear set 16, the carrier C2, that is, the output gear 28 is rotated in the positive direction by a positive torque (i.e., a torque acting in a positive direction) generated by the second electric motor MG2 in the engaged state of the brake BK2.

Figure 6:
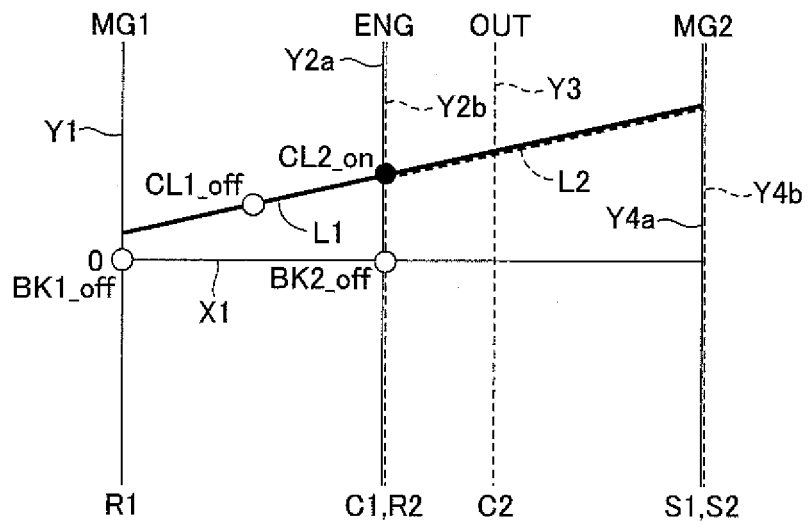
FIG. 6 is a collinear chart having straight lines which permit indication thereon of the relative rotating speeds of the rotary elements of the drive system of FIG. 1, the collinear chart corresponding to a drive mode HV2 indicated in FIG. 4.

The collinear chart of FIG. 6 corresponds to the drive mode HV2 of the drive system 10, which is preferably the hybrid drive mode in which the engine 12 is used as the vehicle drive power source while the first and second electric motors MG1 and MG2 are operated as needed to generate a vehicle drive force and/or an electric energy. Described by reference to this collinear chart of FIG. 6, the differential function of the first planetary gear set 14 with respect to the rotary motion received from the engine 12 is permitted in the released states of the clutch CL1 and the brake BK1, and the carrier C1 of the first planetary gear set 14 and the ring gear R2 of the second planetary gear set 16 are not rotatable relative to each other, in the engaged state of the clutch CL2, that is, the carrier C1 and the ring gear R2 are integrally rotated as a single rotary component in the engaged state of the clutch CL2. The sun gears S1 and S2, which are fixed to each other, are integrally rotated as a single rotary component. Namely, in the drive mode HV2 of the drive system 10, the first and second planetary gear sets 14 and 16 function as a differential device comprising a total of four rotary components. That is, the drive mode HV2 is a composite split mode in which the four rotary components are connected to each other in the order of description in the rightward direction as seen in FIG. 6. The four rotary components consist of: the ring gear R1 (connected to the first electric motor MG1); a rotary member consisting of the carrier C1 and the ring gear R2 connected to each other (and connected to the engine 12); the carrier C2 (connected to the output gear 28); and a rotary member consisting of the sun gears S1 and S2 fixed to each other (and connected to the second electric motor MG2).

In the drive mode HV2, the carrier C1 of the first planetary gear set 14 and the ring gear R2 of the second planetary gear set 16 are connected to each other in the engaged state of the clutch CL2, so that the carrier C1 and the ring gear R2 are rotated integrally with each other. Accordingly, either one or both of the first and second electric motors MG1 and MG2 can receive a reaction force corresponding to the output of the engine 12. Namely, one or both of the first and second electric motors MG1 and MG2 can be operated to receive the reaction force during an operation of the engine 12, and each of the first and second electric motors MG1 and MG2 can be operated at an operating point assuring a relatively high degree of operating efficiency, and/or with a reduced degree of torque limitation due to heat generation.

The collinear chart of FIG. 5 also corresponds to the drive mode EV1 of the drive system 10, which is preferably the EV drive mode in which the engine 12 is held at rest while the second electric motor MG2 is used as the vehicle drive power source. Described by reference to this collinear chart of FIG. 5, the differential function of the first planetary gear set 14 with respect to the rotary motion received from the engine 12 is permitted in the released states of the clutch CL1 and the brake BK1, and the carrier C1 of the first planetary gear set 14 and the ring gear R2 of the second planetary gear set 16 are rotatable relative to each other in the released state of the clutch CL2. Further, in the engaged state of the brake BK2, the ring gear R2 of the second planetary gear set 16 is fixed to the stationary member in the form of the housing 26, so that the rotating speed of the ring gear R2 is held zero. In this drive mode EV1, the carrier C2, that is, the output gear 28 is rotated in the positive direction by a positive torque (i.e., a torque acting in a positive direction) generated by the second electric motor MG2 in the second planetary gear set 16. Namely, the hybrid vehicle provided with the drive system 10 can be driven in the forward direction with the positive torque generated by the second electric motor MG2. In this case, the first electric motor MG1 is preferably held in a free state.

Figure 7:
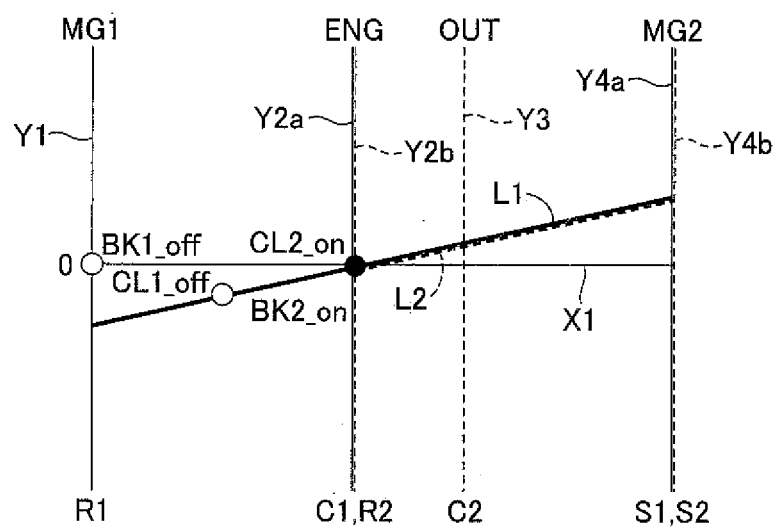
FIG. 7 is a collinear chart having straight lines which permit indication thereon of the relative rotating speeds of the rotary elements of the drive system of FIG. 1, the collinear chart corresponding to a drive mode EV2 indicated in FIG. 4.

The collinear chart of FIG. 7 corresponds to the drive mode EV2 of the drive system 10, which is preferably the EV drive mode in which the engine 12 is held at rest while at least one of the first and second electric motors MG1 and MG2 is used as the vehicle drive power source. Described by reference to this collinear chart of FIG. 7, the differential function of the first planetary gear set 14 with respect to the rotary motion received from the engine 12 is permitted in the released states of the clutch CL1 and the brake BK1, and the carrier C1 of the first planetary gear set 14 and the ring gear R2 of the second planetary gear set 16 are not rotatable relative to each other in the engaged state of the clutch CL2. Further, in the engaged state of the brake BK2, the ring gear R2 of the second planetary gear set 16 and the carrier C1 of the first planetary gear set 14 which is connected to the ring gear R2, are fixed to the stationary member in the form of the housing 26, so that the rotating speeds of the ring gear R2 and the carrier C1 are held zero. In this drive mode EV2, the rotating directions of the ring gear R1 and the sun gear S1 of the first planetary gear set 14 are opposite to each other. Namely, the carrier C2, that is, the output gear 28 is rotated in the positive direction by a negative torque (acting in the negative direction) generated by the first electric motor MG1, and/or a positive torque (acting in the positive direction) generated by the second electric motor MG2. That is, the hybrid vehicle provided with the drive system 10 can be driven in the forward direction when the torque is generated by at least one of the first and second electric motors MG1 and MG2.

In the drive mode EV2, at least one of the first and second electric motors MG1 and MG2 may be operated as the electric generator. In this case, one or both of the first and second electric motors MG1 and MG2 may be operated to generate a vehicle drive force (torque), at an operating point assuring a relatively high degree of operating efficiency, and/or with a reduced degree of torque limitation due to heat generation. Further, at least one of the first and second electric motors MG1 and MG2 may be held in a free state, when the generation of an electric energy by a regenerative operation of the electric motors MG1 and MG2 is inhibited due to full charging of the battery 48. Namely, the drive mode EV2 can be established under various running conditions of the hybrid vehicle, or may be kept for a relatively long length of time.

Accordingly, the drive mode EV2 is advantageously provided on a hybrid vehicle such as a plug-in hybrid vehicle, which is frequently placed in an EV drive mode.

The drive modes "$1^{st}$-speed" through "$4^{th}$-speed" indicated in FIG. 4 are the constant-speed-ratio drive modes which are established when the differential functions of the first and second planetary gear sets 14 and 16 are limited and in which the ratio of the output speed of the first or second planetary gear set 14, 16 to the speed of the rotary motion received from the engine 12 is held constant. In the drive modes "$1^{st}$-speed" through "$4^{th}$-speed", one of the clutch CL1 and the brake BK1 is placed in the engaged state to hold constant the ratio of the output speed of the first planetary gear set 14 to the speed of the rotary motion received from the engine 12.

Figure 8:
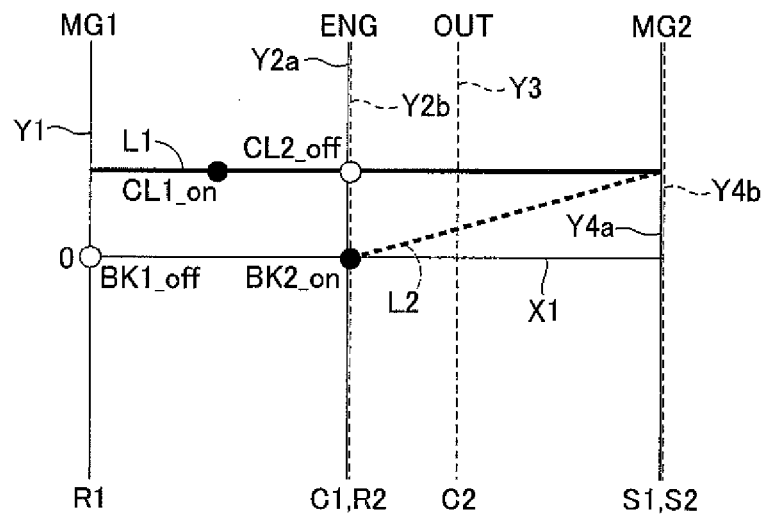
FIG. 8 is a collinear chart having straight lines which permit indication thereon of the relative rotating speeds of the rotary elements of the drive system of FIG. 1, the collinear chart corresponding to a drive mode "$1^{st}$-speed" indicated in FIG. 4.

The collinear chart of FIG. 8 corresponds to the drive mode "$1^{st}$-speed". Described more specifically by reference to this collinear chart of FIG. 8, the rotary elements of the first planetary gear set 14 are rotated as a single rotary unit in the engaged state of the clutch CL1. Namely, the operating speeds of the first electric motor MG1 connected to the ring gear R1, the engine 12 connected to the carrier C1 and the second electric motor MG2 connected to the sun gear S1 (sun gear S2) are equal to each other, so that the drive force received from the engine 12 is transmitted to the sun gear S2 of the second planetary gear set 16 through the first planetary gear set 14 the rotary elements of which are rotated as a single rotary unit. In the second planetary gear set 16, the ring gear R2 is fixed to the housing 26 through the brake BK2 placed in the engaged state, so that the speed of the rotary motion of the engine 12 transmitted to the sun gear S2 is reduced by the second planetary gear set 16 before the rotary motion is transmitted from the carrier C2 to the output gear 28. In the drive mode "$1^{st}$-speed", the speed of the rotary motion of the engine 12 is changed at a constant ratio corresponding to this drive mode, before the rotary motion is transmitted to the output gear 28. Further, a drive force generated by at least one of the first and second electric motors MG1 and MG2 may be transmitted to the output gear 28.

Figure 9:
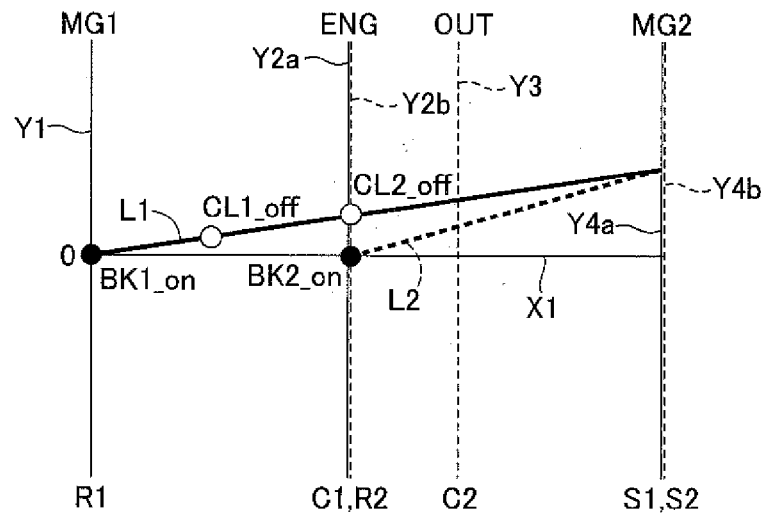
FIG. 9 is a collinear chart having straight lines which permit indication thereon of the relative rotating speeds of the rotary elements of the drive system of FIG. 1, the collinear chart corresponding to a drive mode "$2^{nd}$-speed" indicated in FIG. 4.

The collinear chart of FIG. 9 corresponds to the drive mode "$2^{nd}$-speed". Described more specifically by reference to this collinear chart of FIG. 9, the ring gear R1 of the first planetary gear set 14 is fixed to the housing 26 through the brake BK1 placed in the engaged state, so that the speed of the rotary motion of the engine 12 transmitted to the carrier C1 is raised by the first planetary gear set 14 before the rotary motion is transmitted from the carrier C1 to the sun gear S2. In the second planetary gear set 16, the ring gear R2 is fixed to the housing 26 through the brake BK2 placed in the engaged state, so that the speed of the rotary motion of the engine 12 transmitted to the sun gear S2 is reduced by the second planetary gear set 16 before the rotary motion is transmitted from the carrier C2 to the output gear 28. In the drive mode "$2^{nd}$-speed", the speed of the rotary motion of the engine 12 is changed at a constant ratio corresponding to this drive mode, before the rotary motion is transmitted to the output gear 28. Further, a drive force generated by the second electric motor MG2 may be transmitted to the output gear 28. In the engaged state of the brake BK1, the operating direction of the second electric motor MG2 is the same as the operating direction of the engine 12.

Figure 10:
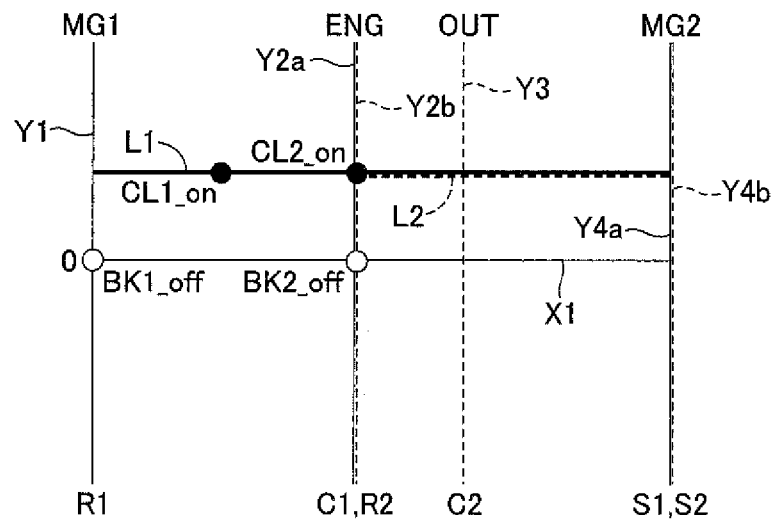
FIG. 10 is a collinear chart having straight lines which permit indication thereon of the relative rotating speeds of the rotary elements of the drive system of FIG. 1, the collinear chart corresponding to a drive mode "$3^{rd}$-speed" indicated in FIG. 4.

The collinear chart of FIG. 10 corresponds to the drive mode "$3^{rd}$-speed". Described more specifically by reference to this collinear chart of FIG. 10, the rotary elements of the first planetary gear set 14 are rotated as a single rotary unit in the engaged state of the clutch CL1. Namely, the operating speeds of the first electric motor MG1 connected to the ring gear R1, the engine 12 connected to the carrier C1 and the second electric motor MG2 connected to the sun gear S1 (sun gear S2) are equal to each other. Further, the rotary elements of the first and second planetary gear sets 14 and 16 are rotated as a single rotary unit in the engaged state of the clutch CL2. Accordingly, the drive force of the engine 12 transmitted to the carrier C1 is transmitted from the carrier C2 to the output gear 28 through the first and second planetary gear sets 14 and 16 the rotary elements of which are rotated as the single rotary unit. In the drive mode "$3^{rd}$-speed", the speed of the rotary motion of the engine 12 is changed at a constant ratio (=1) corresponding to this drive mode, before the rotary motion is transmitted to the output gear 28. Further, a drive force generated by at least one of the first and second electric motors MG1 and MG2 may be transmitted to the output gear 28.

Figure 11:
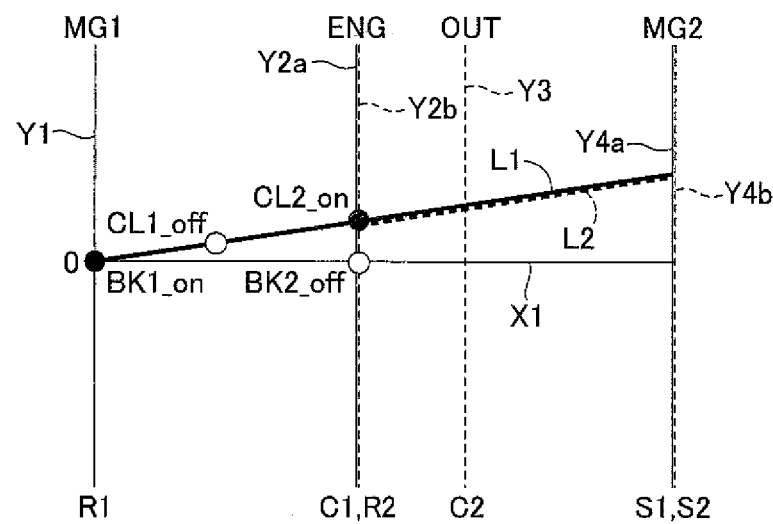
FIG. 11 is a collinear chart having straight lines which permit indication thereon of the relative rotating speeds of the rotary elements of the drive system of FIG. 1, the collinear chart corresponding to a drive mode "$4^{th}$-speed" indicated in FIG. 4.

The collinear chart of FIG. 11 corresponds to the drive mode "$4^{th}$-speed". Described more specifically by reference to this collinear chart of FIG. 11, the carrier C1 of the first planetary gear set 14 and the ring gear R2 of the second planetary gear set 16 are connected to each other through the clutch CL2 placed in the engaged state, so that the rotary elements of the first and second planetary gear sets 14 and 16 are rotated as a single rotary unit. Namely, the operating speeds of the carrier C1 and the ring gear R2 which are connected to each other, and the operating speed of the engine 12 are equal to each other. Further, the ring gear R1 of the first planetary gear set 14 is fixed to the housing 26 through the brake BK1 placed in the engaged state, so that the speed of the rotary motion of the engine 12 transmitted to the carrier C1 and the ring gear R2 connected to each other is raised before the rotary motion is transmitted from the carrier C2 to the output gear 28. In the drive mode "$4^{th}$-speed", the speed of the rotary motion of the engine 12 is changed at a constant ratio corresponding to this drive mode, before the rotary motion is transmitted to the output gear 28. Further, a drive force generated by the second electric motor MG2 may be transmitted to the output gear 28. In the engaged state of the brake BK1, the operating direction of the second electric motor MG2 is the same as the operating direction of the engine 12.

FIG. 12 is the functional block diagram illustrating major control functions of the electronic control device 30. A drive mode switching control portion 110 shown in FIG. 12 is configured to determine the drive mode of the drive system 10 that should be established. Described more specifically, the drive mode switching control portion 110 selects one of the drive modes indicated in FIG. 4, on the basis of the accelerator pedal operation amount $A_{CC}$ detected by the accelerator pedal operation amount sensor 32, the vehicle running speed V corresponding to the output speed detected by the output speed sensor 40, the output $P_{bt}$ of the battery 48 detected by the battery sensor 42, etc., and according to a predetermined drive mode switching map.

The drive mode switching control portion 110 establishes a selected one of the plurality of drive modes of FIG. 4, namely, selectively establishes one of: the hybrid drive modes HV1 and HV2 in which the output torque of the engine 12 and the output torque of at least one of the first and second electric motors MG1 and MG2 are transmitted to the output gear 28; the EV drive mode EV1 in which only the output torque of the second electric motor MG2 is transmitted to the output gear 28; the EV drive mode EV2 in which the output torques of the first and second electric motors MG1 and MG2 are transmitted to the output gear 28; and the constant-speed-ratio drive modes "$1^{st}$-speed" through "$4^{th}$-speed" in which the differential functions of the first and second planetary gear sets 14 and 16 are limited.

A clutch engagement control portion 112 is configured to control the operating states of the clutches CL1 and CL2 through the hydraulic control unit 54. Described more specifically, the clutch engagement control portion 112 controls output hydraulic pressures of solenoid control valves provided in the hydraulic control unit 54 to control the clutches CL1 and CL2, for controlling the hydraulic pressures $P_{CL1}$ and $P_{CL2}$ which determine the operating states (torque capacities) of the clutches CL1 and CL2. The clutch engagement control portion 112 is preferably configured to control the operating states of the clutches CL1 and CL2, according to the drive mode selected by the drive mode switching control portion 110. Namely, the clutch engagement control portion 112 is basically configured to control the torque capacities of the clutches CL1 and CL2, so as to place the clutch CL1 in the released state and place the clutch CL2 in the engaged state when the drive mode switching control portion 110 has determined that the drive system 10 should be switched to the drive mode HV2, EV2 or "$4^{th}$-speed", and so as to place both of the clutches CL1 and CL2 in the released states when the drive mode switching control portion 110 has determined that the drive system 10 should be switched to the drive mode HV1, EV1 or "$2^{nd}$-speed". Further, the clutch engagement control portion 112 controls the torque capacities of the clutches CL1 and CL2 so as to place the clutch CL1 in the engaged state and place the clutch CL2 in the released state when the drive mode switching control portion 110 has determined that the drive system 10 should be switched to the drive mode "$1^{st}$-speed", and so as to place both of the clutches CL1 and CL2 in the engaged states when the drive mode switching control portion 110 has determined that the drive system 10 should be switched to the drive mode "$3^{rd}$-speed".

A brake engagement control portion 114 is configured to control the operating state of the brakes BK1 and BK2 through the hydraulic control unit 54. Described more specifically, the brake engagement control portion 114 controls output hydraulic pressures of solenoid control valves provided in the hydraulic control unit 54 to control the brakes BK1 and BK2, for controlling the hydraulic pressures $P_{BK1}$ and $P_{BK2}$ which determine the operating states (torque capacities) of the brakes BK1 and BK2. The brake engagement control portion 114 is preferably configured to control the operating states of the brakes BK1 and BK2, according to the drive mode selected by the drive mode switching control portion 110. Namely, the brake engagement control portion 114 is basically configured to control the torque capacities of the brakes BK1 and BK2, so as to place the brake BK1 in the released state and place the brake BK2 in the engaged state when the drive mode switching control portion 110 has determined that the drive system 10 should be switched to the drive mode HV1, EV1, EV2 or "$1^{st}$-speed", and so as to place both of the brakes BK1 and BK2 in the released states when the drive mode switching control portion 110 has determined that the drive system 10 should be switched to the drive mode HV2 or "$3^{rd}$-speed". Further, the brake engagement control portion 114 controls the torque capacities of the brakes BK1 and BK2, so as to place both of the brakes BK1 and BK2 in the engaged states when the drive mode switching control portion 110 has determined that the drive system 10 should be switched to the drive mode "$2^{nd}$-speed", and so as to place the brake BK1 in the engaged state and place the brake BK2 in the released state when the drive mode switching control portion 110 has determined that the drive system 10 should be switched to the drive mode "$4^{th}$-speed".

An engine drive control portion 116 is configured to control an operation of the engine 12 through the engine control device 52. For instance, the engine drive control portion 116 commands the engine control device 52 to control an amount of supply of a fuel by the fuel injecting device of the engine 12 into an intake pipe, a timing of ignition (ignition timing) of the engine 12 by the igniting device, and the opening angle $\theta_{TH}$ of the electronic throttle valve, so that the engine 12 generates a required output, that is, a target torque (target engine output).

A first electric motor drive control portion 118 is configured to control an operation of the first electric motor MG1 through the inverter 50. For example, the first electric motor drive control portion 118 controls an amount of an electric energy to be supplied from the battery 48 to the first electric motor MG1 through the inverter 50, so that the first electric motor MG1 generates a required output, that is, a target torque (target MG1 output). A second electric motor drive control portion 120 is configured to control an operation of the second electric motor MG2 through the inverter 50. For example, the second electric motor drive control portion 120 controls an amount of an electric energy to be supplied from the battery 48 to the second electric motor MG2 through the inverter 50, so that the second electric motor MG2 generates a required output, that is, a target torque (target MG2 output).

In the hybrid drive modes in which the engine 12 is operated while the first and second electric motors MG1 and MG2 are used as the vehicle drive power source, a required vehicle drive force to be generated by the drive system 10 (output gear 28) is calculated on the basis of the accelerator pedal operation amount $A_{CC}$ detected by the accelerator pedal operation amount sensor 32, and the vehicle running speed V corresponding to the output speed $N_{OUT}$ detected by the output speed sensor 40. The operations of the first and second electric motors MG1 and MG2 are controlled by the first and second electric motor drive control portions 118 and 120, while the operation of the engine 12 is controlled by the engine drive control portion 116, so that the calculated required vehicle drive force is obtained by the output torque of the engine 12 and the output torques of the first and second electric motors MG1 and MG2.

A parking lock control portion 122 is configured to control an operation of the parking lock mechanism in the form of the shift switching device 58 according to the presently selected shift position of the manually operated shifting device 46. The parking lock control portion 122 is basically configured to control an operation of the actuator 60 for controlling an angular position of the detent member 66 according to the output signal of the shift position sensor 44 indicative of the selected shift position $P_S$ of the shifting device 46. Namely, the parking lock control portion 122 controls the operation of the actuator 60 to place the detent member 66 in the parking lock position when the operation of the shifting device 46 to the parking position is detected by the shift position sensor 44. In the parking lock position of the detent member 66, the engaging tooth 90 of the parking lock pawl 86 is held in engagement with the external teeth 84 of the parking lock gear 82, so that the shift switching device 58 is placed in the parking lock position in which the rotary motion of the parking lock gear 82 is prevented. When the operation of the shifting device 46 to any non-parking position (any position other than the parking position) is detected by the shift position sensor 44, on the other hand, the parking lock control portion 122 controls the operation of the actuator 60 to place the detent member 66 in the non-parking-lock position. In the non-parking-lock position of the detent member 66, the engaging tooth 90 of the parking lock pawl 86 is not held in engagement with the external teeth 84 of the parking lock gear 82, so that the rotary motion of the parking lock gear 82 is not prevented (that is, is permitted).

An engine starting control portion 124 is configured to implement an engine starting control for starting the engine 12. Namely, the engine starting control portion 124 is basically configured to command the engine control device 52 to start the engine 12, when the engine 12 which has been held at rest is required to be started. For instance, the engine starting control portion 124 implements the engine starting control for starting the engine, 12, when the drive mode switching control portion 110 has determined that the drive system 10 should be switched from the EV drive mode EV1 or EV2 in which the engine 12 is held at rest, to the hybrid drive mode HV1 or HV2.

Where the engine 12 is required to be started while the rotary motion of the parking lock gear 82 is prevented by the shift switching device 58 and the vehicle has been held at rest, the engine starting control portion 124 starts the engine 12 in a first starting mode in which the brake BK1 is placed in the engaged state, and the operating speed of the engine 12 is raised with the output torque of the second electric motor MG2 while the rotary motion of the parking lock gear 82 is kept prevented. For example, the engine starting control portion 124 starts the engine 12 in the first starting mode, where the engine 12 is required to be started when the shift position $P_S$ detected by the shift position sensor 44 is the parking position while the vehicle running speed V detected by the output speed sensor 40 is zero.

Figure 14:
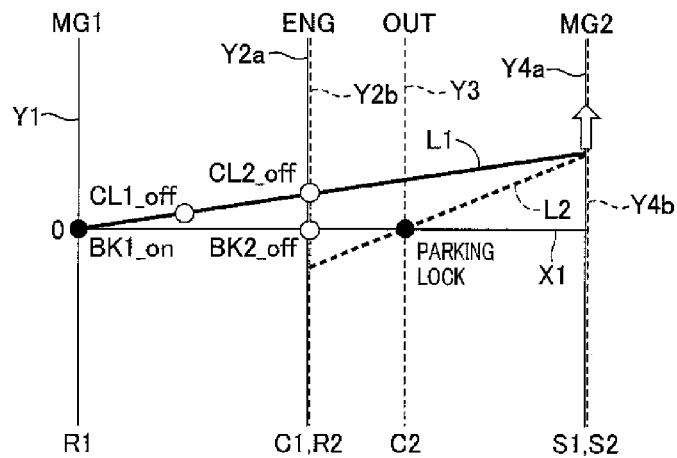
FIG. 14 is a collinear chart having straight lines which permit indication thereon of the relative rotating speeds of the rotary elements of the drive system of FIG. 1 when the engine is started in the first starting mode.

FIG. 13 is the table indicating the operating states of the clutches CL1 and CL2 and the brakes BK1 and BK2 when the engine 12 is started in the first starting mode. In the table, a "o" mark and a blank respectively indicate the engaged and released states of the clutches and brakes. In the first starting mode, the brake BK1 is placed in the engaged state while the clutches CL1 and CL2 and the brake BK2 are placed in the released states, as indicated in FIG. 13. FIG. 14 is the collinear chart having straight lines which permit indication thereon of the relative rotating speeds of the rotary elements of the drive system 10 when the engine 12 is started in the first starting mode. When the brake BK1 is placed in the engaged state, the operating speed of the first electric motor MG1 (the rotating speed of the ring gear R1) is zero, as indicated in FIG. 14. Since the rotary motion of the parking lock gear 82 is prevented by the shift switching device 58, the rotating speed of the output gear 28 (carrier C2) is held at zero, so that the operating speed $N_E$ of the engine 12 can be raised with the positive torque (indicated by a white arrow in FIG. 14) generated by the second electric motor MG2, without generation of a reaction force by the first electric motor MG1, or without bringing the brake BK2 into the engaged state. Namely, the engine 12 is cranked by operating only the second electric motor MG2 while the first electric motor MG1 is held at rest, so that an amount of electric energy required to start the engine 12 can be reduced.

The engine starting control portion 124 is preferably configured to start the engine 12 in the above-described first starting mode where the output $P_{bt}$ of the battery 48 detected by the battery sensor 42 is smaller than a predetermined threshold value $P_o$. That is, the engine starting control portion 124 raises the operating speed of the engine 12 with the output torque of the second electric motor MG2 while the rotary motion of the parking lock gear 82 is prevented by the shift switching device 58 and while the brake BK1 is placed in the engaged state. Where the output $P_{bt}$ of the battery 48 detected by the battery sensor 42 is not smaller than the predetermined threshold value $P_o$, the engine starting control portion 124 starts the engine 12 in a second starting mode in which the operating speed $N_E$ of the engine 12 is raised with the output torque of the first electric motor MG1 while the second electric motor MG2 is operated to generate a reaction force. When the engine 12 is started in the second starting mode, the parking lock control portion 122 permits the rotary motion of the parking lock gear 82. That is, the parking lock control portion 122 places the detent member 66 in the non-parking-lock position in which the rotary motion of the parking lock gear 82 is permitted. The above-indicated threshold value $P_o$ is a lower limit of the output $P_{bt}$ of the battery 48 predetermined by experimentation, above which the operating speed $N_E$ of the engine 12 can be sufficiently raised for starting the engine 12 with the output torque generated by the first electric motor MG1 while the second electric motor MG2 is operated to generate the reaction force.

The engine starting control portion 124 is preferably configured to start the engine 12 in the second starting mode, by placing the brake BK2 in the engaged state while placing the clutches CL1 and CL2 and the brake BK1 in the released states, and by operating the first electric motor MG1 to generate the output torque for raising the operating speed $N_E$ of the engine 12 while the second electric motor MG2 is operated to generate the reaction force. FIG. 5 is the collinear chart having the straight lines which permit indication thereon of the relative rotating speeds of the rotary elements of the drive system 10, when the engine 12 is started in the second starting mode as described above. As is apparent from this collinear chart, the differential function of the first planetary gear set 14 with respect to the rotary motion received from the engine 12 is permitted in the released states of the clutch CL1 and the brake BK1. In the released state of the clutch CL2, the carrier C1 of the first planetary gear set 14 and the ring gear R2 of the second planetary gear set 16 are rotatable relative to each other. In the engaged state of the brake BK2, the ring gear R2 of the second planetary gear set 16 is fixed to the stationary member in the form of the housing 26, so that the rotating speed of the ring gear R2 is held at zero. In this state, the operating speed $N_E$ of the engine 12 can be raised with the positive torque generated by the first electric motor MG1 while the reaction force is generated by the second electric motor MG2.

Preferably, the engine starting control portion 124 is configured to start the engine 12 in the second starting mode, by placing the clutch CL2 in the engaged state while placing the clutch CL1 and the brakes BK1 and BK2 in the released states, and by operating the first electric motor MG1 to generate the output torque for raising the operating speed $N_E$ of the engine 12 while the second electric motor MG2 is operated to generate the reaction force. FIG. 6 is the collinear chart having the straight lines which permit indication thereon of the relative rotating speeds of the rotary elements of the drive system 10, when the engine 12 is started in the second starting mode as described above. As is apparent from this collinear chart, the differential function of the first planetary gear set 14 with respect to the rotary motion received from the engine 12 is permitted in the released states of the clutch CL1 and the brake BK1. In the engaged state of the clutch CL2, the carrier C1 of the first planetary gear set 14 and the ring gear R2 of the second planetary gear set 16 are rotated as a unit. The sun gears S1 and S2 which are fixed to each other are rotated as a unit. In this state, the operating speed $N_E$ of the engine 12 can be raised with the positive torque generated by the first electric motor MG1 while the reaction force is generated by the second electric motor MG2.

As described above, the engine 12 is started in the second starting mode where the output $P_{bt}$ of the battery 48 is sufficiently large, that is, equal to or larger than the threshold value $P_o$ above which the operating speed $N_E$ of the engine 12 can be sufficiently raised for starting the engine 12 with the output torque generated by the first electric motor MG1 while the second electric motor MG2 is operated to generate the reaction force. Accordingly, the vehicle drive mode can be speedily switched from the hybrid drive mode HV1 or HV2 after the engine 12 has been started. Thus, the hybrid vehicle can smoothly start running just after the manually operated shifting device 46 is operated to the drive position D.

Figure 15:
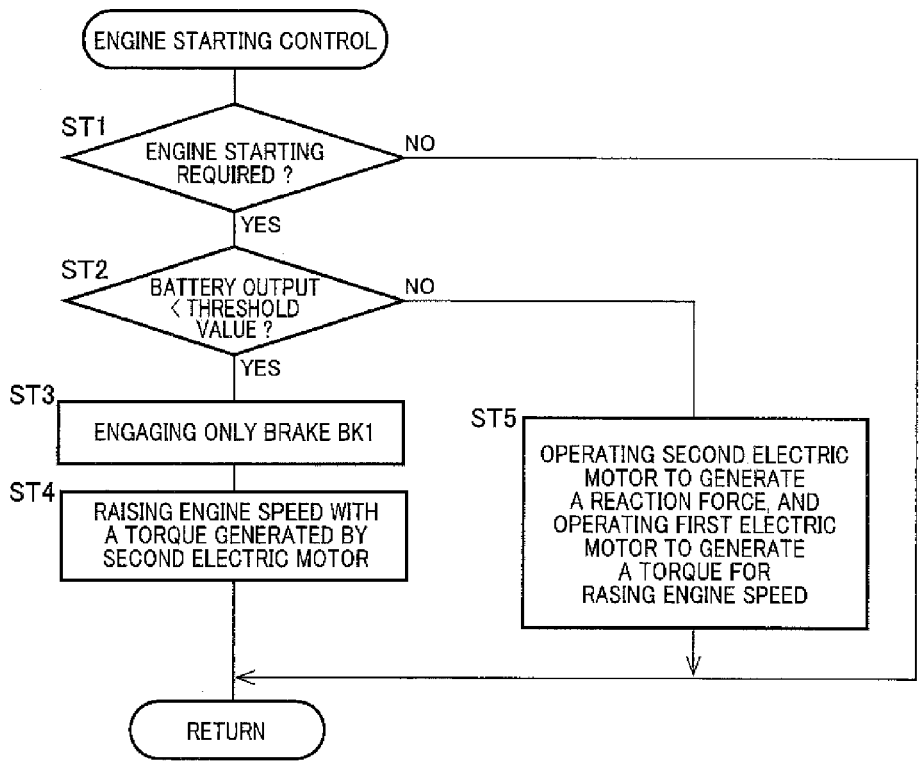
FIG. 15 is a flow chart illustrating a major portion of one example of an engine starting control implemented by the electronic control device shown in FIG. 2.

FIG. 15 is the flow chart illustrating a major portion of one example of an engine starting control implemented by the electronic control device 30. The engine starting control is repeatedly implemented with a predetermined cycle time.

The engine starting control is initiated with a step ST1 to determine whether the engine 12 is required to be started while the vehicle has been held at rest. If a negative determination is obtained in the step ST1, the engine starting control is terminated. If an affirmative determination is obtained in the step ST1, the control flow goes to a step ST2 to determine whether the output $P_{bt}$ of the battery 48 detected by the battery sensor 42 is smaller than the predetermined threshold value $P_o$. If an affirmative determination is obtained in the step ST2, the control flow goes to a step ST3. If a negative determination is obtained in the step ST2, the control flow goes to a step ST5 in which the shift switching device 58 is controlled to permit the rotary motion of the parking lock gear 82, and the operating speed $N_E$ of the engine 12 is raised with the output torque of the first electric motor MG1 while the second electric motor MG2 is operated to generate the reaction torque. The engine starting control is terminated with the step ST5. In the ST3, the shift switching device 58 is controlled to prevent (to keep prevention of) the rotary motion of the parking lock gear 82, and the brake BK1 is placed in the engaged state while the clutches C11 and CL2 and the brake BK2 are placed in the released states. The step ST3 is followed by a step ST4 in which the operating speed $N_E$ of the engine 12 is raised with the output torque of the second electric motor MG2. The engine starting control is terminated with the step ST4.

In the engine starting control described above, the steps ST2 and ST5 need not be implemented. That is, the steps ST3 and ST4 may be always implemented irrespective of the output $P_{bt}$ of the battery 48, when the engine 12 is required to be started while the rotary motion of the parking lock gear 82 is prevented by the parking lock mechanism in the form of the shift switching device 58 and the vehicle has been held at rest. It will be understood from the foregoing description of the engine starting control illustrated in FIG. 15 that the step ST1 corresponds to an operation of the drive mode switching control portion 110, and the step ST3 corresponds to operations of the clutch engagement control portion 112 and the brake engagement control portion 114, while the step ST5 corresponds to an operation of the first electric motor drive control portion 118, and that the steps ST4 and ST5 correspond to an operation of the second electric motor drive control portion 120, and the steps ST3 and ST5 correspond to an operation of the parking lock control portion 122, while the steps ST1-ST5 correspond to an operation of the engine starting control portion 124.

In the illustrated embodiment, the engine starting control portion 124 is configured to start the engine 12 in the first starting mode in which the operating speed $N_E$ of the engine 12 is raised with the torque generated by the second electric motor MG2 in the engaged state of the brake BK1, where the engine 12 is required to be started while the rotary motion of the parking lock gear 82 is prevented by the parking lock mechanism in the form of the shift switching device 58 and the vehicle has been held at rest. Accordingly, the engine 12 can be adequately started even while the output $P_{bt}$ of the battery 48 is insufficient, as in a cold state of the engine 12.

Namely, the illustrated embodiment provides a control apparatus in the form of the electronic control device 30 for the hybrid vehicle drive system 10, which permits adequate starting of the engine 12, irrespective of the output $P_{bt}$ of the battery 48.

The illustrated embodiment is further configured such that the engine starting control portion 124 starts the engine 12 in the first starting mode when the output $P_{bt}$ of the battery 48 detected by the battery sensor 42 is smaller than the predetermined threshold value $P_o$. Accordingly, the engine 12 can be adequately started even while the output $P_{bt}$ of the battery 48 is insufficient, as in the cold state of the engine.

The illustrated embodiment is also configured such that the engine starting control portion 124 starts the engine 12 in the second starting mode in which the operating speed $N_E$ of the engine 12 is raised with the torque generated by the first electric motor MG1 while the second electric motor MG2 is operated to generate the reaction force, where the engine 12 is required to be started while the output $P_{bt}$ of the battery 48 detected by the battery sensor 42 is not smaller than the predetermined threshold value $P_o$. Accordingly, the first and second electric motors MG1 and MG2 cooperate with each other to crank the engine 12 for starting the engine 12 where the output $P_{bt}$ of the battery 48 is sufficient. Therefore, the hybrid vehicle can smoothly start running after the engine 12 has been started.

The drive system 10 has a risk of occurrence of vibrations a whole drive train giving a shock to the hybrid vehicle, due to a torque variation transmitted to the output shaft (output side power transmitting path) when the engine 12 is started in the engaged state of the clutch CL2 or the brake BK2. However, the control apparatus in the form of the electronic control device 30 according to the illustrated embodiment is configured to start the engine 12 in the first starting mode in which the above-described risk can be adequately avoided.

While the preferred embodiment of this invention has been described by reference to the drawings, it is to be understood that the invention is not limited to the details of the illustrated embodiments, but may be embodied with various changes which may occur without departing from the spirit of the invention.

NOMENCLATURE OF REFERENCE SIGNS

10: Hybrid vehicle drive system
12: Engine
14: First planetary gear set (First differential mechanism)
16: Second planetary gear set (Second differential mechanism)
26: Housing (Stationary member)
28: Output gear (Output rotary member)
30: Electronic control device
42: Battery sensor
46: Manually operated shifting device
48: Battery
58: Shift switching device (Parking lock mechanism)
82: Parking lock gear
BK1: Brake
C1: Carrier (Rotary element)
C2: Carrier (Rotary element)
MG1: First electric motor
MG2: Second electric motor
R1: Ring gear (Rotary element)
R2: Ring gear (Rotary element)
S1: Sun gear (Rotary element)
S2: Sun gear (Rotary element)

The invention claimed is:

1. A control apparatus for a drive system of a hybrid vehicle including: a first differential mechanism provided with a rotary element connected to an engine and a rotary element connected to a first electric motor; a second differential mechanism provided with a rotary element connected to a second electric motor and a rotary element connected to an output rotary member; a brake configured to selectively fix the rotary element of the first differential mechanism connected to the first electric motor, to a stationary member; and a parking lock mechanism configured to prevent a rotary motion of a parking lock gear connected directly or indirectly to the output rotary member, when a manually operated shifting device is operated to a parking lock position, the control apparatus comprising:

an engine starting control portion configured to start the engine in a first starting mode in which an operating speed of the engine is raised with a torque generated by the second electric motor in an engaged state of the brake, where the engine is required to be started while the vehicle has been held at rest and the rotary motion of the parking lock gear is prevented by the parking lock mechanism.

2. The control apparatus according to claim 1, further comprising a battery sensor configured to detect an output of a battery, and wherein the engine starting control portion starts the engine in the first starting mode when the output of the battery detected by the battery sensor is smaller than a predetermined threshold value.

3. The control apparatus according to claim 2, wherein the engine starting control portion starts the engine in a second starting mode in which the operating speed of the engine is raised with a torque generated by the first electric motor while the second electric motor is operated to generate a reaction torque, where the engine is required to be started while the output of the battery detected by the battery sensor is not smaller than the predetermined threshold value.

* * * * *